United States Patent [19]

Stewart et al.

[11] Patent Number: 4,572,535

[45] Date of Patent: Feb. 25, 1986

[54] TRI-SUPPORTED VEHICLE

[76] Inventors: Brian C. Stewart; Michael S. Lofgren, both of 20589 SW. Elk Horn Ct., Tualatin, Oreg. 97062

[21] Appl. No.: 671,964

[22] Filed: Nov. 16, 1984

[51] Int. Cl.$^4$ .................. B62K 5/04; B62K 17/00
[52] U.S. Cl. .................. 280/282; 280/281 LP; 280/266; 280/267
[58] Field of Search .............. 280/282, 281 LP, 220, 280/111, 266, 267

[56] References Cited

U.S. PATENT DOCUMENTS 579,176  3/1897  Peardon ........................... 280/63
4,359,231  11/1982  Mulcahy ...................... 280/281 LP
4,432,561  2/1984  Feikema et al. ............... 280/281 LP Primary Examiner—John J. Love
Assistant Examiner—Donn McGiehan
Attorney, Agent, or Firm—Robert L. Harrington,

[57] ABSTRACT

A three-wheeled vehicle having a front body member carrying the front wheel and seat, pivotally connected to a rear body member carrying the rear wheels and handlebar. The pivotal connection is designed to pivot the front body member around a pivotal axis that is projected upwardly and rearwardly at a location rearward of the front wheel whereby pivoting produces sideward and rearward tilting of the front wheel and opposite turning of the rear wheels. Steering is achieved by such pivoting of the front body member which in turn is achieved by a sideward swinging of the seat that is positioned between the two pivotal connections. The rear wheels are preferably canted to provide increased stability for the vehicle as it is maneuvered through a turn.

16 Claims, 8 Drawing Figures

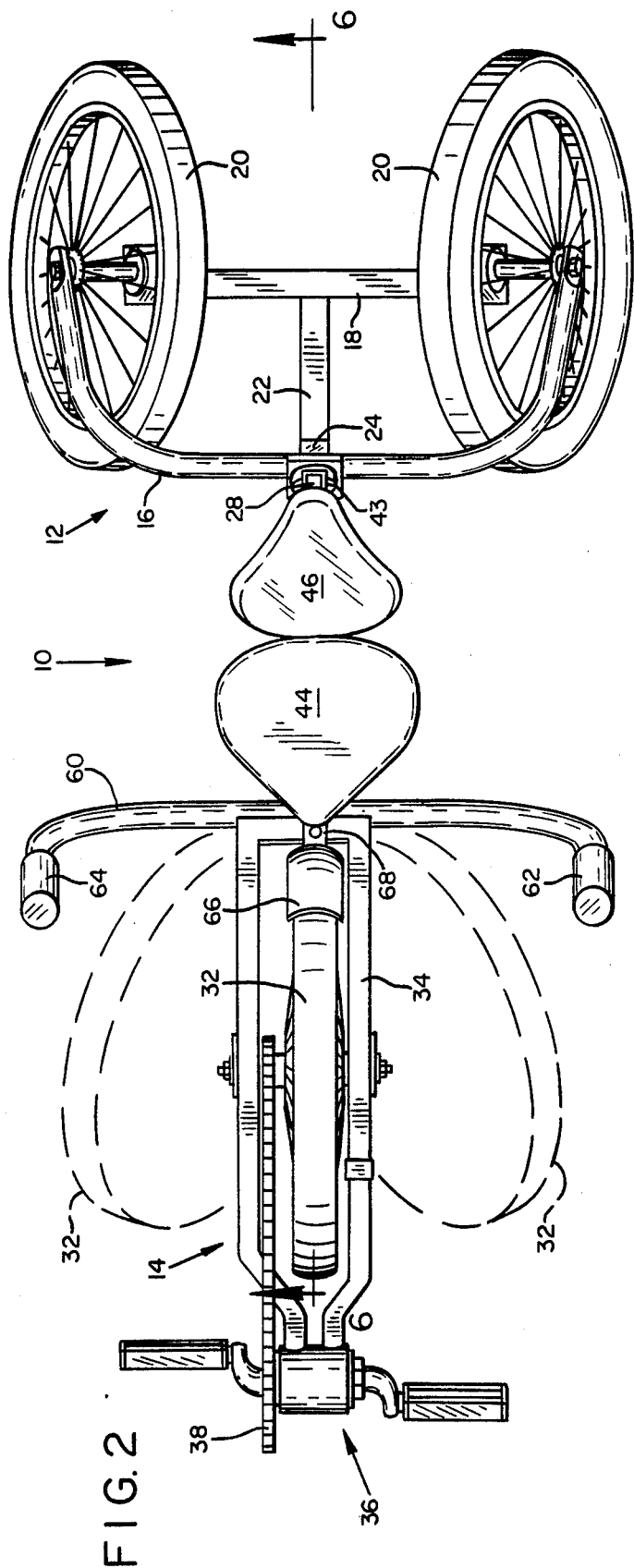
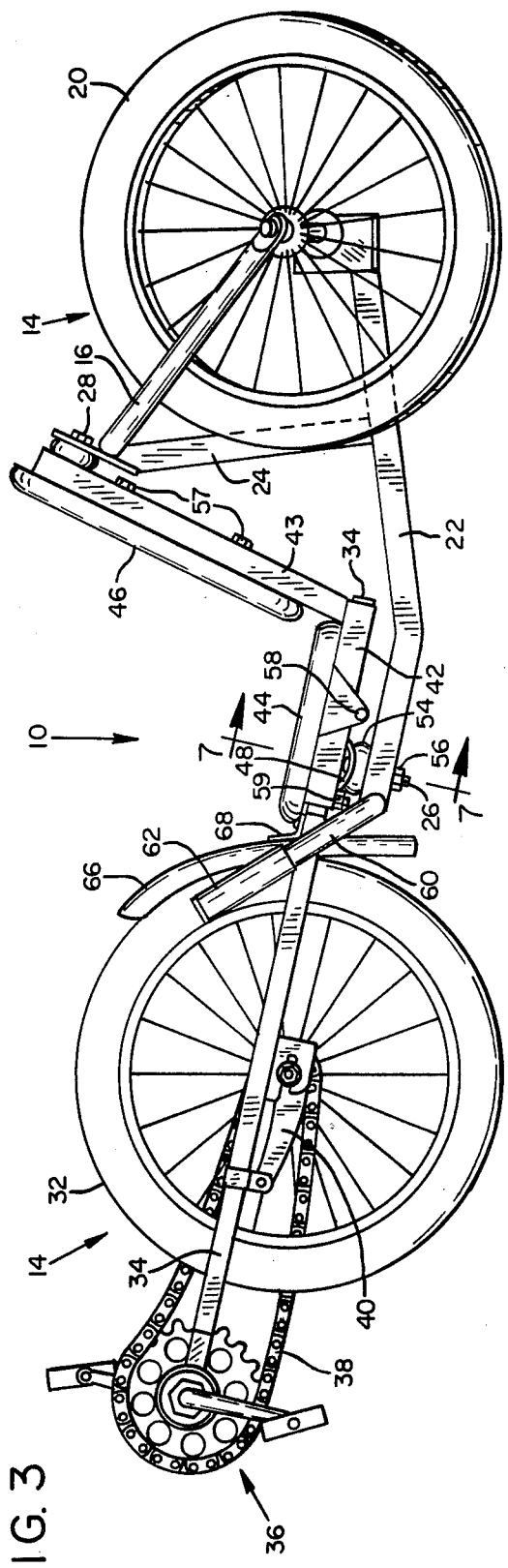
FIG. 2
FIG. 3

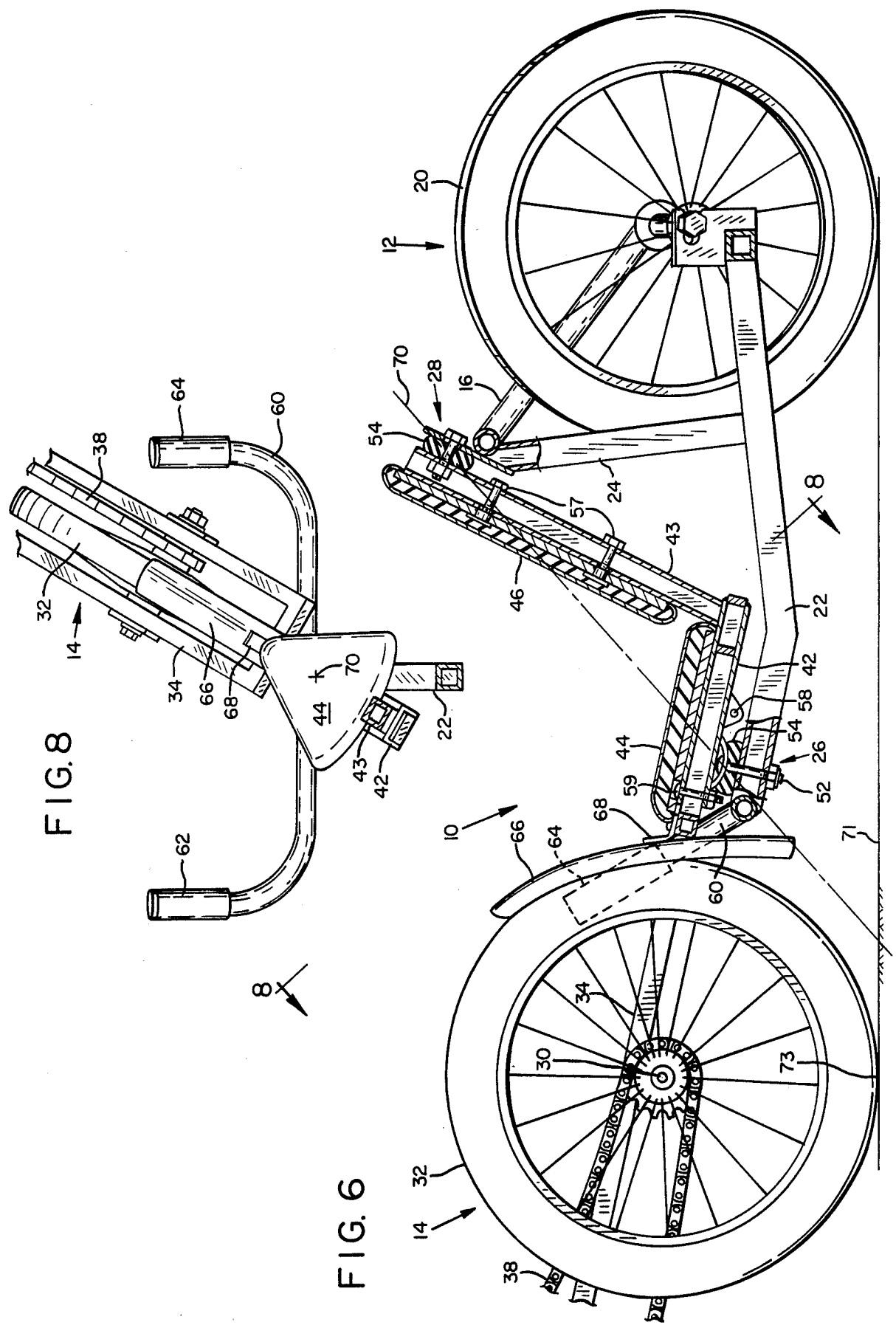

TRI-SUPPORTED VEHICLE

FIELD OF INVENTION

This invention relates to vehicles generally classified in the broad category of tricycles and similar tri-supported vehicles, and more particularly to a tricycle having improved stability and maneuverability.

BACKGROUND OF INVENTION

As compared to bicycles, tricycles are generally considered easier and safer to ride but only at slow speeds. In a typical tricycle design, a unified frame is supported on three-wheels. The tricycle remains in a rigid upright position regardless of whether it is going straight or turning. The weight of a rider is substantially centered above the tricycle and while making a turn, the tricycle will tip over if the attempted turn generates any substantial centrifugal force.

A bicycle can maneuver through a turn at a far greater speed because of the rider's ability to "lean" into the turn. The wheels are tipped and the centrifugal force is at least partially directed through the angled wheel hub to the contact area of the tire and roadway. The centrifugal force is thus directed toward urging a sliding of the tire on the roadway rather than lateral tipping and some of that force is directed downward to further enhance the gripping action of the tire to the roadway and thus resist slipping.

BRIEF DESCRIPTION OF THE INVENTION

The present invention is directed to the achievement of a maneuvering capability for a tricycle that is similar to that of a bicycle. The preferred embodiment of the present invention generally provides a dual frame structure whereby the front wheel and seat are carried by one of the frame members which is pivotally interconnected to the frame member carrying the rear wheels. The pivotal connection between the frame members allows the rider to control tilting of the front wheel by leaning one way or the other in the seat. The pivotal axis is such that the tilting of the front wheel produces limited turning of the wheel. Also, because the pivotal axis is between the front wheel and the rear wheels, a lateral buckling takes place with the rear wheels turning opposite the front wheel to further accentuate the turn.

RECITATION OF PRIOR ART

Others have attempted to achieve more stability for a tricycle but none have succeeded to the extent of the present invention. Reference is made to the following patents: U.S. Pat. No. 4,198,072, to Hopkins (4/15/80); U.S. Pat. No. 3,981,516, to Havgkvist, et al (9/21/76); U.S. Pat. No. 3,643,558, to McMullen (2/29/72); U.S. Pat. No. 4,279,429, to Hopkins, et al (7/21/81).

None of these references achieves tilting of the front wheel and relative turning of the front wheel and rear wheels (enhanced by lateral buckling) through body control as achieved by the preferred structure of the present invention. The invention will however, be further appreciated by reference to the following detailed description and drawings.

DRAWINGS AND DETAILED DESCRIPTION

FIG. 2 is a top view of the tricycle of FIG. 1;

FIG. 3 is a side view of the tricycle of FIGS. 1 and 2;

FIG. 4 is a rear view of the tricycle of FIGS. 1, 2, and 3;

FIG. 6 is a cross sectional view as taken on view lines 6—6 of FIG. 2;

FIG. 7 is a cross sectional view as taken in view lines 7—7 of FIG. 3; and

FIG. 8 is a view of the tilted position of the front body member as if taken on view lines 8—8 of FIG. 6.

Figure 1:
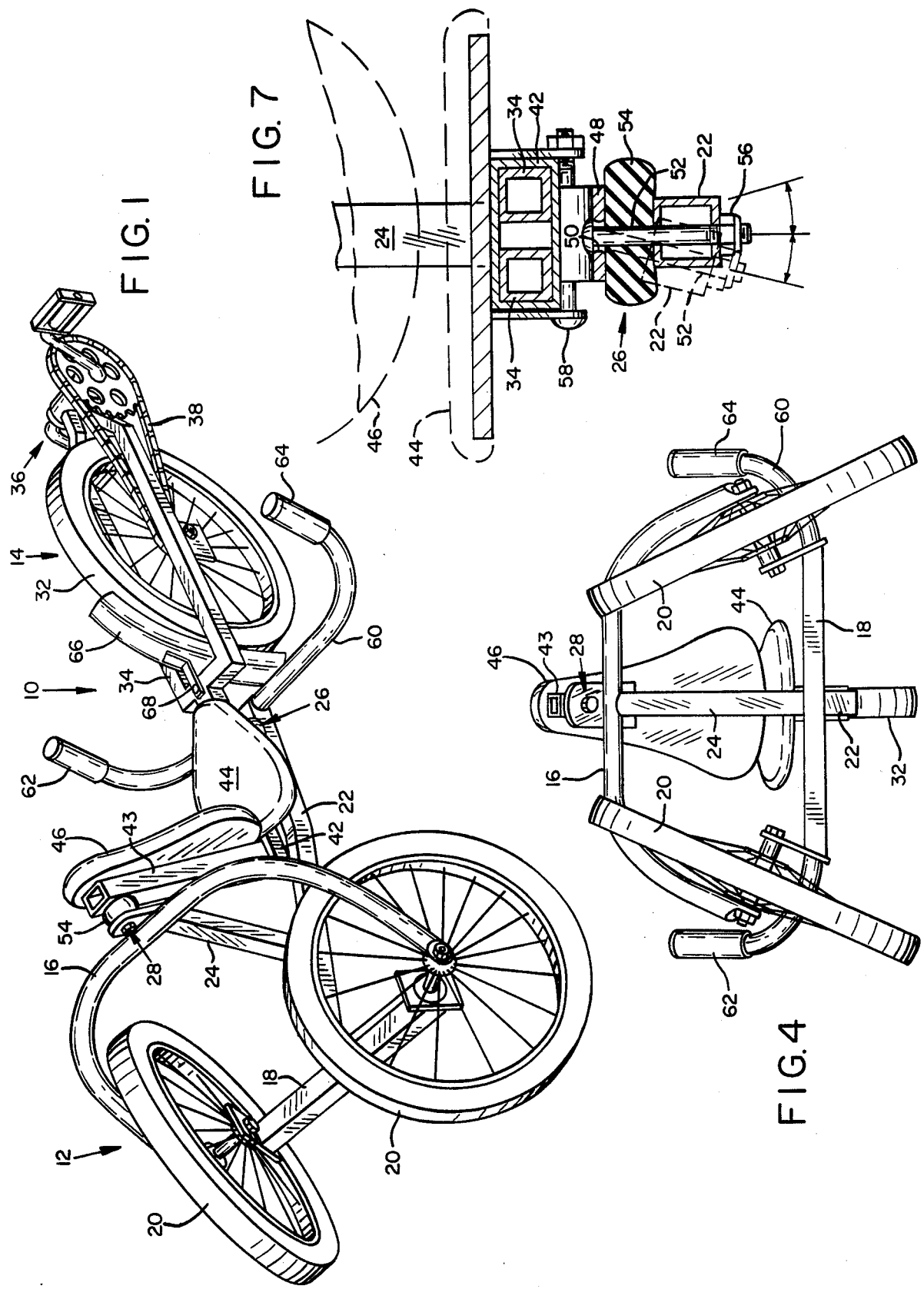
FIG. 1 is an upper perspective view of a tricycle in accordance with the invention.

Referring to the drawing figures, the tricycle 10 of the present invention is comprised of a unified rear body member 12 and a unified front body member 14. The rear body member 12 includes a frame having an inverted U shaped bar 16. The ends of the bar 16 are connected to opposite ends of an axle 18 on which rear wheels 20 are rotatably supported in spaced relationship and adapted for parallel movement on the ground. A forwardly projected bar 22 from the axle 18, and an upwardly projected bar 24 from bar 22, along with the U shaped bar 16 make up a rigid L shaped frame. A first pivotal connection 26 is provided at the forward end of bar 22, and a second pivotal connection 28 is provided on the upper end of bar 24 in a position rearwardly and upwardly relative to the first pivotal connection and forward of axle 18.

The front body member 14 includes an axle 30 supporting a front wheel 32. A rigid fork shaped support bar 34 straddles the front wheel 32, and supports the axle 30 on each side of the wheel 32. The support bar 34 projects forwardly of the wheel, and supported at the outer end thereof is a foot pedal mechanism 36 (of generally conventional design). the foot pedal mechanism is interconnected through a drive chain 38 to the axle 30 of the wheel 32. It will be understood that one way circular peddling of the foot peddle mechanism 36 will drive the front wheel 32 forwardly. A brake mechanism 40 (also of generally conventional design) is engaged by reverse peddling motion to stop the forward movement of the tricycle.

The support bar 34 projects rearwardly of the wheel 32 and is telescopingly interconnected to an L shaped section having a lower leg 42 and an upper leg 43. It will be appreciated that, whereas support bar 34 can be adjusted forwardly and rearwardly relative to this L shaped section (to adjust to the rider's body and leg length) these sections of the front body member are interlocked during the riding operation of the tricycle. FIGS. 3, 6 and 7 illustrate the telescoping relationship of the front section of support bar 34 and the L shaped section which are secured together as by engagement of the bolt and nut arrangement 59.

A seat 44 and back rest 46 are fastened with conventional brackets and bolts (57 and 58) to the legs 42 and 43 respectively. The forward end of leg 42 is connected by pivotal connection 26 to bar 22 of the rear body member, and the upper end of leg 43 is connected by pivotal connection 28 to the bars 24 and 16 of the rear body member.

FIG. 7 in particular illustrates the pivotal connection 26 which includes a boss 48 depending from leg 42. The boss 48 is provided with bolt hole 50 through which a headed bolt 52 projects. Bolt 52 passes through a compressable spacer 54 and through holes in bar 22. A nut 56 threadably engaging the projected end of bolt 52 secures leg 42 of the front body member to bar 22 of the rear body member. This permits pivotal movement of the seat about the axis of the bolt, with limited side to side movement also permitted by the compressability of spacer 54 (see the dash line position of the bolt 52 in FIG. 7).

The pivotal connection 28 is structured similar to that of pivotal connection 26 (permitting both pivotal and swinging action of the connections). Both connections 26 and 28 thus function in a manner similar to an universal joint to permit limited pivoting of the interconnected parts. Such pivoting defines an axis 70 which is angled at about 35° to 45° from the horizontal plane and intersects the ground (on which the three wheels are supported) at a point rearward of the front wheel and between the front and rear wheels. Whereas this pivotal intersection with the ground rearward of the point of contact between the ground and the front wheel can vary, it is considered important for obtaining opposite rear wheel turning (to be described hereafter), that this distance is at least 2 inches and no less than about 5% of the distance, front to rear, between the front and rear wheels. A distance of 10 inches or more is believed excessive for conventional tricycle sizes e.g. 40 to 45 inches front to back between the front and rear wheels. Also, whereas a 35° to 45° angle for axis 70 is preferred, the benefits will be readily noted within a range of 30° to 70°.

A handlebar 60 is secured to bar 22 of the rear body member as by welding, and includes a left hand grip 62 and a right hand grip 64.

OPERATION

The rider-operator of the novel tricycle described above, first adjusts the foot pedal mechanism 36 to his body length by adjusting the telescoping interconnection between the front section of bar 34 (carrying the wheel and peddle mechanism) and L shaped section 42, 43 (carrying the seat and back rest). Upon adjustment, these sections are securely locked together as by engagement of the nut and bolt arrangement 59.

The rider then seats himself in the seat 44, leans back against the back rest 46, and positions his feet on the peddles of the foot peddle mechanism 36. The front wheel 32 is aligned with the center of seat 44 and is located between the rider's legs. (A fender 66 is mounted to the bar 34 behind the front wheel 34 with a connecting strap 68 to protect the rider from the wheel 32.) The hand grips 62 and 64 are conveniently located at the rider's side near the riders hips. It will be appreciated that the entire support for the rider is carried on the front body member 14 with the exception of the handlebar 60 and hand grips 62 and 64 which are rigidlly connected to the rear body member 12.

It will be further understood that the weight of the rider is supported between the front and rear wheels with most of the weight supported by the seat 44 located at a level about at the height of axles 18 and 30 of the wheels. Furthermore, the rider's weight is primarily supported on the seat at a position that is below and behind the center line or axis 70 that interconnects pivotal connections 26 and 28 (as best seen in FIG. 6).

The rider can pivot the seat and back rest around the angled axis 70 in a swinging motion, relative to the rear body member, which is supported on the spaced apart rear wheels 20. In that the seat and back rest are rigidly connected to the front body member, which member also rigidly carries the front wheel, the contact of the front wheel on the ground, in combination with the pivoting movement of the seat and back rest about axis 70, controls the handling of the tricycle as will now be explained.

The rider will normally center his weight on the seat and back rest and sit in an upright position. The wheel 32 is accordingly also positioned in an upright position aligned between the rear wheels. Peddling by the rider drives the tricycle in a generally straight path down the roadway. When the rider wants to turn the tricycle, he accomplishes turning by simply leaning into the direction of the desired turn. For example, leaning to the right with the upper body creates an imbalance of the rider's weight relative to center line 70. Gravity alone will cause the seat and back rest to compensate by swinging outwardly to the left. However, such swinging action may preferably be enhanced by the rider pulling the seat over toward handlebar 62 as will be later explained.

Figure 5:
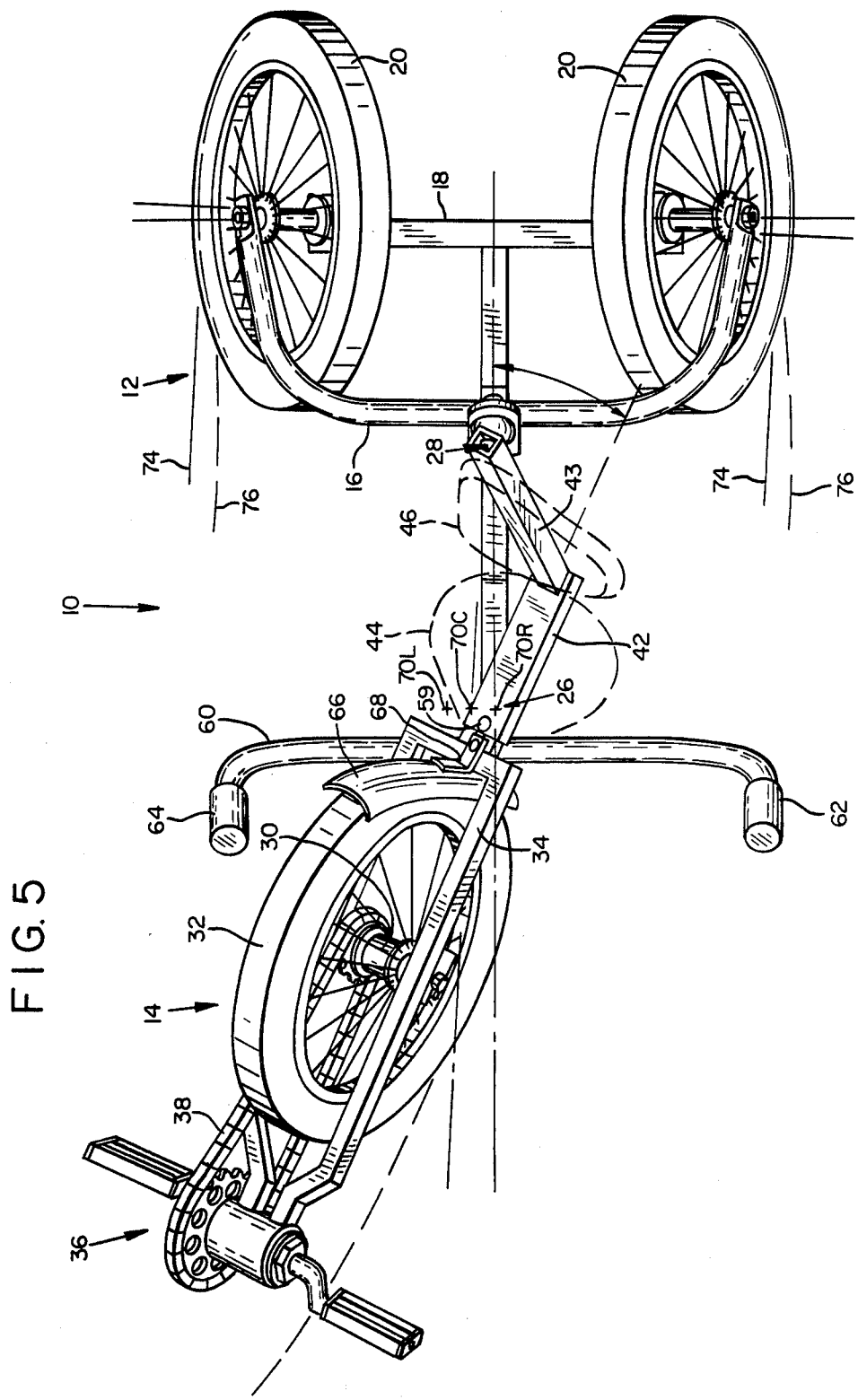
FIG. 5 is a view similar to FIG. 2 but showing the tricycle in a turning condition and with parts removed for illustration purposes.

The reaction of the front and rear body members to the repositioning of the seat and back rest is best illustrated in FIG. 5. However, also refer to FIGS. 6 and 8 and note that, relative to the rear body member, the entire front body member pivots about the axis 70. FIG. 8 is a view taken of the front body member as if taken along view lines 8—8 which is in line with the axis 70.

Because of the angle of the axis 70 about which the wheel 30 is pivoted, wheel 30 is tilted both rearwardly and to the side relative to its contact on the ground as illustrated in the top view of FIG. 5. This achieves the dual effect of leaning the wheel into the direction of turn (with the resultant effect previously described for bicycle turning), and additionally physically turns the wheel into the desired direction.

A secondary effect is also realized by the pivoting of the front body member relative to the rear body member about axis 70. With the wheel 32 being positioned forward of the axis 70 i.e. with the axis intersecting the ground 71 (FIG. 6) at a position rearward of the contact between the front wheel and ground at 73, the pivoting of the front body member about axis 70 urges a sideward shifting of the position of the wheel 32 relative to the center line 72 of the rear body member. That is, the wheel 32 is urged to shift upwardly from center line 72 for a right turn as seen in the top view of FIG. 5. Whereas the front wheel is engaging the ground, a physical shifting of the front wheel is resisted. This resistance causes the rear body member to pivot opposite to that of the turned direction of the front wheel. Note that center 72 is shifted downwardly to position 72a in FIG. 5. This phenomenon is referred to as lateral buckling of the rear member relative to the front member. This buckling will be further noted in FIG. 5 wherein the rear wheel directional lines are shown before pivoting at 74 and following pivoting at 76, and also by noting the position of axis 70 (as it pierces pivot 26), prior to turning at 70C, and after turning at 70R (70L being the opposite position of the axis occuring for a left turn of the vehicle). This secondary effect is believed to contribute to the tricycles ability to make relatively sharp turns with a minimal turning of wheel 32.

Reference is now made to FIG. 4 wherein the mounting for the rear wheels is illustrated. Both wheels are canted inwardly at about an angle of 25° to 30° from the vertical. This is generally mated to the degree of tilting achieved by the front wheel when making a full turn. Whereas the canted rear wheels will urge turning of the bicycle, when running in a straight line the turning forces are balanced and the tricycle smoothly follows a straight path. In a turning situation such as illustrated in FIG. 5, the centrifugal force shifts the weight of the rider and the vehicle to the outside wheel. The canted outside rear wheel then is coordinated with the tilted front wheel to achieve the stablizing effect heretofore achieved only with bicycles.

The coordinating effect of the outside rear wheel and tilted front wheel makes the tricycle highly maneuverable and the rider can easily and safely negotiate turns right and left at significantly higher speeds than heretofore considered safe for tricycles. Whereas turning of the tricycle is solely effected by the pivoting of the front body member relative to the rear body member, the handle bars 60 and hand grip 62 and 64 do not function to turn the front wheel in the conventional sense, but aid the rider in shifting his seat to effect pivoting. Thus, as desired, the rider may assist the gravity effect of weight distribution by simply pulling the seat toward the appropriate hand grip (which it will be recalled is rigidly mounted to the rear body member) to thereby effect the pivoting of the front body member about axis 70.

Whereas the above described and illustrated embodiment is believed to be the best mode of the invention, it will be appreciated that many modifications are possible without departing from the concept of the invention. For example, the pivotal connections can be moved forward or back, and up or down, to effect a change in the reaction of the front body member to a side-to-side shifting of the seat. Also, the location of the pivotal axis 70 relative to the front wheel (i.e. within a range of 2 inches to 10 inches rearward of point 73) will alter the turning action but the desired result will still be realized. Still further, the invention may be applied to a sled having a front runner and two rear runners (or other steerable support members) replacing the tricycle's wheels. Accordingly, these and other modifications are considered to be encompassed within the scope of the invention as determined by the definitions of the claims appended hereto.

We claim:

1. A tri-supported vehicle comprising; a first body member including a single steerable support member for supporting the first body member on the ground and adapted for controlling the direction of movement of the vehicle, a support bar supporting said steerable support member, and a seat for carrying a rider supported by said support bar and rigidly interconnected through said support bar to the steerable support member whereby pivotal movement of the seat effects similar pivotal movement of the steerable support member, a second body member including a pair of spaced apart steerable support members for supporting the second body member on the ground, said pair of steerable support members locked together in spaced and parallel directed relationship, a support frame supporting said pair of support members, and a first pivotal connection on said support frame, and a second pivotal connection on said support frame located rearwardly and upwardly relative to the first pivotal connection, said first and second pivotal connections establishing between them a pivotal axis, said first and second pivotal connections connecting the second body member to the first body member whereby the first body member is pivotable relative to the second body member, said pivotal axis being angled so as to intersect the ground between the steerable support member and pair of support members and sufficiently rearward of the steerable support member to effect lateral buckling between the support bar and support frame while turning, and said pivotal connections permitting pivotal swinging of the seat about the pivotal axis so as to effect side and rearward tilting of the single steerable support member for stabilized maneuvering of the vehicle.

2. A tri-support vehicle as defined in claim 1 wherein said pivotal axis is angled from between 30° and 70° as compared to the ground on which the steerable support members are supported.

3. A tri-support vehicle as defined in claim 2 wherein the steerable support members are wheels defining a tricycle.

4. A tri-supported vehicle as defined in claim 3 wherein the pivotal axis intersects the ground at least 5% of the distance between the front and rear wheels, front to back.

5. A tri-supported vehicle as defined in claim 4 including drive means for driving one of the wheels.

6. A tri-supported vehicle as defined in claim 5 wherein the single wheel is a front wheel and the support bar is projected rearwardly of the front wheel, an L shaped section forming the rearward projection of the support bar with the seat supported on the lower leg of the L shaped section, a back rest supported on the upper leg of the L shaped section, and said first pivotal connection connected to the lower leg of said L shaped section forwardly on the seat portion thereof, and said second pivotal connection connected to the upper leg of said L shaped section upwardly on the back rest portion thereof, whereby swinging of the back rest and seat portion effects pivoting of the first body member about the pivotal axis defined by the pivotal connections.

7. A tri-supported vehicle as defined in claim 6 including a foot pedal mechanism supported on said support bar of the first body member and drivngly engaged with the front wheel for driving the vehicle.

8. A tri-supported vehicle as defined in claim 7 wherein adjustment means is provided on the support bar between the foot pedal mechanism and the seat for adjusting the distance between the foot pedal mechanism and the seat.

9. A tri-supported vehicle as defined in claim 8 wherein the adjustment means includes a telescoping interfit between the support bar section forward of the L shaped section and the L shaped section, and releasable locking means to releasably lock the L shaped section to the support bar section.

10. A tri-supported vehicle as defined in claim 6 wherein the pivotal connections include a bolt passing generally upwardly thru the frame of the second body member and through the lower leg of the L shaped section of the first body member to thereby permit horizontal pivoting of the seat, and a bolt passing generally forwardly thru the frame of the second body member and thru the upper leg of the L shaped section of the first body member to thereby permit vertical pivoting of the back rest, and compressible spacers on each of said bolts between the frame and L shaped section to permit pivoting of the bolts and to thereby adapt the pivoting of the seat and back rest around the established pivotal axis.

11. A tri-supported vehicle as defined in claim 6 including a handlebar projected forwardly from the frame of said second body member to a position forwardly on the seat portion of the L shaped section of the first body member, and hand grips extended outwardly and upwardly from the handlebar at each side of the seat to be gripped by the rider.

12. A tri-supported vehicle as defined in claim 4 wherein the pair of spaced interconnected wheels are canted inwardly.

13. A tricycle adapted for riding on the ground comprising; a front rigid body member including a single front wheel, a support bar supporting said front wheel at a position intermediate of its ends, a foot pedal mechanism supported on the forward end of the support bar and an L shaped section formed at the rearward end of the support bar; a rigid rear body member including a pair of parallel directed spaced wheels supported on a support frame, a forwardly projected section of the support frame having a lower member and an upper member, a first pivotal connection means provided on the lower member and second pivotal connection means provided on the upper member positioned rearwardly and upwardly relative to the first pivotal connection means and forwardly relative to the rotative center of said pair of spaced wheels, said pivotal connection means providing a rearwardly and upwardly angled pivotal axis, said axis being angled at about a 35° to 45° angle relative to the ground and intersecting the ground substantially rearward of the ground contact at the front wheel, said first and second pivotal connection means pivotally connected to the lower and upper legs of the L shaped section of the support bar of the front body member for pivoting of the front body member on the pivotal axis defined by the pivotal connection means for tilting and steering of the front wheel while achieving lateral buckling and opposite turning of the rear wheels.

14. A tricycle as defined in claim 13 wherein the spaced parallel directed rear wheels are similarly and oppositely canted inwardly.

15. A tricycle adapted for riding on the ground comprising; a front rigid body member including a single front wheel, a support bar supporting said front wheel at a position intermediate of its ends, and lower and upper legs formed at the rearward end of the support bar a cradle for carrying a rider positioned on the upper and lower legs; a rigid rear body member including a pair of parallel directed spaced wheels supported on a support frame, said spaced wheels being inwardly canted from bottom to top towards one another, the plane of the wheel laterally spaced outside the cradle for directing the centrifical force of a turning motion partially through the ground contact of the effected wheel, a forwardly projected section of the support frame having a lower member and an upper member, a first pivotal connection means provided on the lower member and second pivotal connection means provided on the upper member positioned rearwardly and upwardly relative to the first pivotal connection means, said pivotal connection means providing a rearwardly and upwardly angled pivotal axis, said first and second pivotal connection means pivotally connected to the lower and upper legs of the support bar of the front body member for pivoting of the front body member on the pivotal axis defined by the pivotal connection for tilting and steering of the front wheel.

16. The tricycle as defined by claim 15 wherein the wheels are inclined at an angle of about 25°–30°.

* * * * *